United States Patent [19]

McKay et al.

[11] Patent Number: 4,752,383

[45] Date of Patent: Jun. 21, 1988

[54] BUBBLE GENERATOR

[75] Inventors: Jeffrey D. McKay, West Jordan; Donald G. Foot, Jr., Kaysville, both of Utah

[73] Assignee: The United States of America as represented by the Secretary of the Interior, Washington, D.C.

[21] Appl. No.: 893,427

[22] Filed: Aug. 5, 1986

[51] Int. Cl.⁴ .......................... B03D 1/24; B29C 67/24
[52] U.S. Cl. .................................... 209/164; 209/170; 210/221.2; 261/76; 261/94; 261/123; 261/DIG. 75
[58] Field of Search ............................. 209/164, 170; 210/221.1, 221.2; 261/76, 94, 123, DIG. 75

[56] References Cited

U.S. PATENT DOCUMENTS

| | | | |
|---|---|---|---|
| 3,446,353 | 5/1969 | Davis | 209/164 |
| 3,642,617 | 2/1972 | Brink | 209/170 |
| 4,214,982 | 7/1980 | Pfalzer | 209/164 |
| 4,331,534 | 3/1982 | Barnscheidt | 209/164 |
| 4,450,072 | 3/1984 | Suplicki | 209/170 |

Primary Examiner—Kenneth M. Schor
Assistant Examiner—Thomas M. Lithgow
Attorney, Agent, or Firm—E. Philip Koltos

[57] ABSTRACT

An apparatus and method for generating gaseous bubbles in a liquid body comprises a bubble chamber for mixing a pressurized gas with a liquid at a pressure greater than atmospheric and a fine injector tip for releasing the pressurized gas-liquid mixture from the bubble chamber under a high tip velocity and shear. The apparatus is adapted for supplying bubbles to a flotation column for the treatment of mineral ore materials.

6 Claims, 2 Drawing Sheets

BUBBLE GENERATOR

FIELD OF THE INVENTION

The present invention relates to a bubble generator apparatus for generating gaseous bubbles in a liquid. The bubble generator apparatus is particularly adapted for supplying bubbles to a flotation column for the treatment of mineral ore materials and to other systems requiring forced air induction, solution aeration or liquid-gas dispersion.

BACKGROUND OF THE INVENTION

There are various apparatus and methods known for generating gaseous bubbles in liquids. Additionally, there are numerous processes which require gaseous bubble generation, forced air induction, solution aeration or liquid gas dispersion. One such process comprises the concentration and benefication of mineral ore material by froth flotation. A froth flotation process includes forming an aqueous slurry or pulp containing a mixture of mineral and gangue particles. One or more flotation agents is added to the pulp to promote flotation of either the mineral or the gangue. The pulp is aerated by introducing a plurality of minute air bubbles which become attached to either the mineral particles or the gangue particles and cause these particles to rise to the surface of the pulp. U.S. Pat. Nos. 3,371,779 and 4,287,054 to Hollingsworth et al and 4,247,391 to Lloyd disclose several froth flotation methods and apparatus.

Flotation efficiency is influenced by the size of bubbles supplied to the flotation cell or column. For example, as bubble size decreases, the surface area per unit volume increases whereby more surface area is available for particle attachment. Additionally, bubbles form a wake as they rise and draw unattached particles with them. Thus, the larger the bubble, the faster the rise rate and the greater the amount of material drawn up with the bubble. However, bubble-particle hydrodynamics also suggest that many fine particles may never collide with excessively large bubbles because the fine particles, being low in mass, cannot deviate from the stream line and are swept away as the larger bubbles pass. Accordingly, it is important to control the size of bubbles which are supplied to a flotation column.

While various means are known for generating bubbles for a flotation column or cell, many of the known methods and apparatus suffer various disadvantages. For example, mechanical air induction means, such as pumps, impellers and orifices are known. When using a pump, however, if the air is aspirated in a negative pressure situation, the volume percent of air in the liquid is limited by the pump's capacity to compress the gas in solution and maintain a positive pressure at its outlet. Therefore, if the gas content of the pump feed water exceeds the pump's capacity, the pump will cavitate causing it to lose pressure at its outlet and cease pumping. This limit is generally reached well below the 5% gas in water minimum content needed for column flotation. Additionally, mechanical air induction means often require excessive amounts of chemical frother in order to stabilize the fine bubbles. However, large amounts of frother are chemically detrimental to the flotation separation process, particularly when mineral slimes are included. When using mechanical air induction means, a large recycling load may also be required in order to increase the number of fine bubbles in solution. However, large recycling is energy intensive and inefficient.

High shear impellers are often used for providing bubbles in flotation columns and cells. U.S. Pat. Nos. 1,124,855 to Callow et al and 4,231,974 to Engelbrecht et al discloses impeller means for providing gaseous bubbles. However, the turbulence caused by such impellers negate the benefit of quiescent separation conditions within a flotation column. Additionally, orifices on impellers often plug rapidly due to the presence of solids in the column and, since they are located within the columns, are difficult to repair and replace.

Pressure dissolution means are also known for generating gaseous bubbles in a liquid. However, pressure dissolution means may achieve only a limited volume percent of gas dissolved in water, usually less than 1%, because of the limited solubility of most gases in water. This limit is well below the volume percent of gas necessary for column flotation. The gas solubility may be increased by increasing pressure, which is expensive and requires special high-pressure equipment, or by selecting a more soluble gas than air, such as carbon dioxide, which is an expensive alternative. An additional alternative for increasing gas solubility is decreasing the temperature of the bubble generating system. However, this is also a costly alternative.

Alternatively, electrolytic bubble generation means may be used as disclosed in the Kikindai et al U.S. Pat. No. 3,479,281. However, electrolytic bubble generation is disadvantageous in that it produces flammable hydrogen gas, produces oxygen which may oxidize mineral surfaces, decreases flotation efficiency and often requires the addition of salts to lower solution resistivity. Additionally, electrolytic bubble generation does not produce the large volumes of gas necessary for column flotation and requires large amounts of electrical energy. Finally, only small bubbles in the range of 0.8 to 1.0 mm diameter sizes may be produced using electrolytic bubble generation means and the bubble size may only be controlled by frother addition.

Additional sparger bubble generation systems are disclosed in the Sumiya U.S. Pat. No. 3,032,199 wherein air conduit pipes having small openings for uniformly introducing air into a flotation cell are provided near the bottom of the cell. This type of bubble generator is disadvantageous in that the small openings tend to plug due to scale formation or particulate blocking. Since the bubble generation means is located within the flotation cell, it is difficult to service. Additionally, the bubble generator does not provide for bubble size control except by frother addition. An additional bubble generator is disclosed in the Flynn U.S. Pat. No. 4,512,888.

Thus, there is a need for a bubble generator for supplying gaseous bubbles in a liquid to a flotation cell or column, which bubble generator provides bubble size control without requiring excessive frother additions, is external to the cell or column, and is inexpensive.

SUMMARY OF THE INVENTION

Accordingly, it is an object of the present invention to provide a bubble generator for generating gaseous bubbles in a liquid. It is an additional object of the invention to provide a bubble generator which may be controlled to produce bubbles of various sizes with no or minimal frother addition. A further object of the invention is to provide a bubble generator adapted for use with a flotation column, which bubble generator is external of the flotation column and thus easily accessible for maintenance. Additional objects of the present invention includes providing a bubble generator which produces finer bubbles than conventional spargers, produces bubbles in one pass and therefore does not require recycle of liquid and is mechanically simple and easy to operate.

These and additional objects are provided by the bubble generator apparatus of the present invention which comprises a bubble chamber for mixing a pressurized gas with a liquid at a pressure greater than atmospheric and a fine injector tip for releasing the pressurized gas-liquid mixture from the bubble chamber under a high tip velocity and shear. The apparatus according to the present invention combines means for mixing gas and liquid under pressure to provide pressure dissolution bubble generation with means for releasing the mixture comprising a fine injector tip to provide high shear bubble generation. The bubble generator apparatus is particularly adapted for use in a froth flotation apparatus for supplying gaseous bubbles to a flotation column. Additionally, the present invention relates to a method for generating gaseous bubbles in a liquid using the apparatus of the invention and a method for the froth flotation of mineral ore materials using a froth flotation apparatus including the bubble generator of the invention.

These and additional objects and advantages of the present invention will become more apparent in view of the following detailed description.

BRIEF DESCRIPTION OF THE DRAWING

The following detailed description will be more easily understood in view of the drawing in which FIG. 1 comprises a cross sectional view of the bubble generator according to the present invention.

DETAILED DESCRIPTION

The bubble generator apparatus of the present invention generates gaseous bubbles in a liquid medium. The apparatus includes a bubble chamber for mixing a pressurized gas with a liquid at a pressure greater than atmospheric and a fine injector tip for releasing the pressurized gas-liquid mixture from the bubble chamber under a high tip velocity and shear. Thus, the bubble generator produces bubbles by a combination of pressure dissolution of gas in solution and mechanical air induction.

More particularly, the solubility of a gas in a solution may be increased by increasing the pressure of the gas. When the gas is mixed under pressure with a liquid, part of the gas chemically dissolves in the liquid. The dissolved gas may be released as microbubbles less than 0.1 mm in diameter by releasing the liquid from pressure. Additionally, mechanical air induction means such as a fine injector tip produces a high shear for creating bubbles having a larger size, for example 0.4 to 5 mm in diameter. The bubble generator according to the present invention combines a pressure dissolution means and a mechanical air induction means in order to provide a generator which easily produces bubbles of various sizes.

The bubble generator of the invention will be described in more detail with reference to FIG. 1. While in the present description of the invention the gas will be referred to as air and the liquid will be referred to as water, it should be understood that any gas-liquid combination may be used in the bubble generator according to the present invention.

Figure 1:
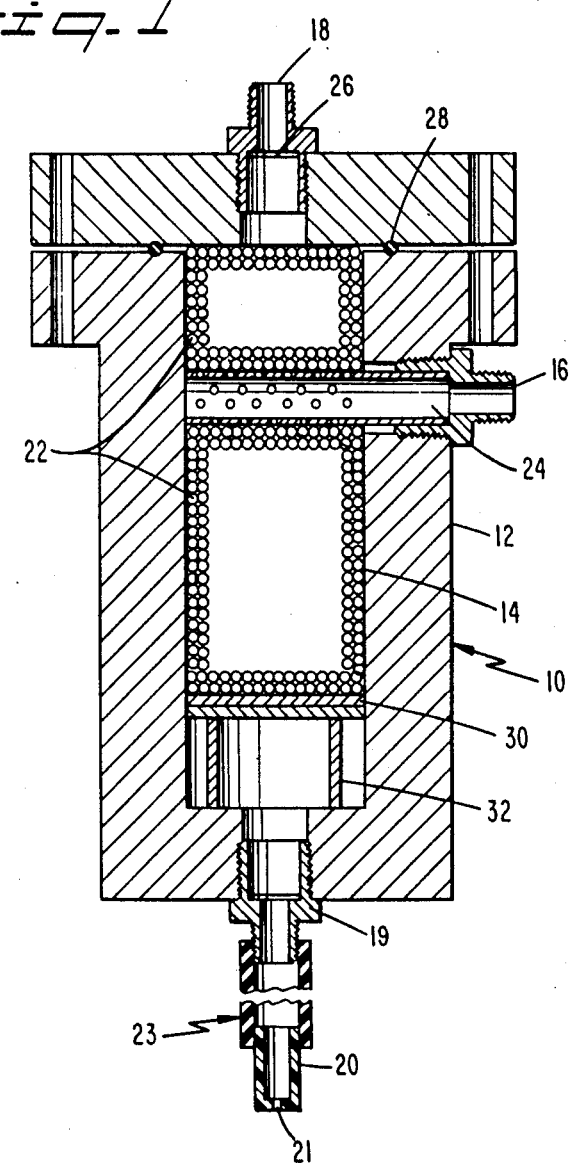

With reference to FIG. 1, the bubble generator of the invention is indicated generally at 10. The bubble generator includes an outer wall 12 within which is formed a bubble chamber 14. The bubble chamber may be of any desired shape and preferably is cylindrical. The outer wall of the bubble generator may be formed of any suitable material such as metal or a synthetic resin such as plexiglass or the like which is resistant to medium pressures. The bubble generator is provided with a multiple port injector indicated generally by numeral 16 for delivering pressurized air to the bubble chamber and at least one water injector 18 for delivering water to the bubble chamber. In operation, pressurized air and water are delivered to the bubble chamber for mixing at a pressure greater than atmospheric. Preferably the pressure in the bubble chamber is greater than 20 psi and more preferably greater than 60 psi. As a result, at least part of the air is chemically dissolved in the water.

The bubble generator further includes air water outlet means 19 which is coupled with a fine injector tip 20 for releasing the pressurized gas-liquid mixture from the bubble chamber under a high tip velocity and shear. Thus, when the pressurized air-water mixture is released from the bubble chamber by the fine injector tip, bubbles are generated due to pressure dissolution and mechanical air induction. That is, when the water under pressure is released from the bubble chamber, the air which is dissolved therein is released as microbubbles having a diameter less than about 0.1 mm. Additionally, owing to the high tip velocity and shear, larger bubbles having diameters of from 0.4 to 5 mm, are produced when the air-water mixture is released through the fine injector tip orifice. Preferably, the injector tip orifice shown enlarged in FIG. 1 for clarity and indicated by numeral 21 has a size of from about 0.02 to about 0.125 inches in diameter, and most preferably is about 0.04 inches in diameter.

Preferably a rubber hose 23 or similar means is connected with the air water outlet 19 for delivering the bubble containing water to the fine injection tip 20.

The bubble generator apparatus according to the invention may further include a packing material 22 contained within the bubble chamber. The packing material increases the mixing of the pressurized gas with the liquid in the bubble chamber and may comprise any well known gas-liquid mixing media such as angular media such as saddles, spherical media such as beads, cylindrical media such as rings, steel wool, glass wool and the like. Preferably, the packing material has a size of at least about 0.1 mm diameter. A preferred packing media comprises 1.0 mm diameter glass beads.

In additionally preferred embodiments, the multiple port gas injector is located between the liquid injector and the fine injector tip. Additionally, the multiple port injector preferably comprises a perforated tube indicated specifically in FIG. 1 by numeral 24, which extends into the bubble chamber for delivering the pressurized gas thereto. The liquid inlet 18 may include a screen or filter member 26 for filtering the liquid which is delivered to the bubble chamber and O-rings 28 may be provided for providing a seal between the liquid injector and the bubble chamber. One or more fritted disks or screens 30 may be provided in the bubble chamber to prevent any packing material contained therein from obstructing or clogging the fine injector tip. Additionally, spacers 32 may be provided within the bubble chamber to support the packing material and prevent short circuiting of air flow in the bubble chamber.

Because the bubble generator according to the present invention includes both mechanical air induction means for creating larger sized bubbles and pressure dissolution means for creating smaller sized bubbles, the size of bubbles produced by the generator apparatus may be easily controlled. More particularly, by controlling the flow of air injected through the multiple port injector and the flow of water injected through the liquid injector, the amount of bubbles produced by each of the mechanical air induction and pressure dissolution means may be varied. At high air to water flow rate ratios, excess air is introduced into the bubble chamber and bubbles are produced predominantly by the high velocity and shear at the injection tip of the air-water mixture. Preferably, the air and water, i.e., gas and liquid, are delivered to the bubble chamber in a gas to liquid volumetric ratio of about 0.2:1 to about 30:1. The bubbles produced by shear at the injection tip generally have a size of from 0.4 to 5 mm in diameter. Conversely, at low air to water flow rate ratios, most of the air which is injected into the bubble chamber is dissolved in the water. Release of the water containing the air dissolved therein at the injection tip forms smaller sized microbubbles having a diameter of less than about 0.1 mm.

The size of bubbles produced by the bubble generator apparatus of the invention may also be adjusted by varying the solution surface tension of the gas-liquid mixture. Adjustment of solution surface tension is achieved through addition of chemicals such as frothers. However, in contrast to the bubble generators known in the art, minimal amounts of frothers, usually less than about 25 ppm, are used for bubble size control in the bubble generator according to the present invention. In contrast, alternative bubble generation systems permit only limited bubble size control through the addition of excessive amounts of surface tension modifiers such as frothers, often 10 to 100 times more than is necessary with the bubble generator of the present invention.

The bubble generator apparatus is preferably used at ambient temperature, particularly when used in connection with a froth flotation column. Decreasing the operation temperature of the bubble generator decreases the size of the bubbles therein, particularly the size of the microbubbles produced by the pressure dissolution means.

An alternate embodiment of the bubble generator apparatus according to the invention includes a plurality of liquid injectors and multiple port gas injectors. The number of liquid and gas injectors may be varied in order to vary the gas and liquid flow rates to control the size of bubbles produced by the bubble generator.

The bubble generator apparatus is particularly adapted for use in a froth flotation apparatus for the treatment of mineral ore materials. A preferred froth flotation apparatus includes a flotation column and a bubble generator external of the column for supplying gaseous bubbles thereto.

Methods of using the bubble generator apparatus of the invention are demonstrated by the following examples. These examples are illustrative and are not meant to limit the scope of the methods or apparatus of the invention.

EXAMPLE 1

Figure 2:
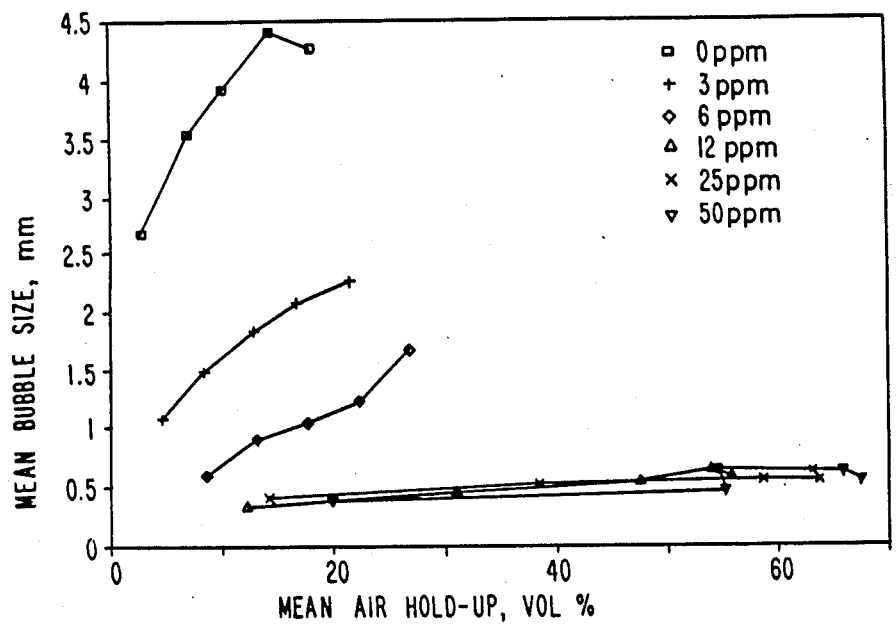
FIG. 2 discloses several ranges of bubble sizes produced with the bubble generator of the present invention.

The bubble generator apparatus of the invention was used to produce air bubbles in water. The volume percentage of air and water supplied to the bubble chamber was varied as set forth in FIG. 2. The average bubble size produced using a particular air to water ratio was determined. As shown in FIG. 2, various sized bubbles were produced using the bubble generator apparatus of the invention, both with and without the addition of varying small amounts of frother.

EXAMPLE 2

The bubble generator of the invention was used to supply bubbles to a flotation column for the treatment of mineral ore material. A multi-component ore from the Fish Creek deposit near Eureka, Nev. which contained fluorite, mica, silica, beryl and calcite was tested for fluorite flotation. The material contained slimes and was treated prior to flotation with sodium carbonate (a pH modifier and water conditioner), sodium silicate (a gangue depressant) and oleic acid (a collector agent). The flotation was first performed using coarse bubbles produced by the bubble generator apparatus of the invention and then performed using fine bubbles produced by the bubble generator apparatus of the invention. Coarse bubble column flotation required 2.0, 1.5 and 0.8 lb/st and fine bubble column flotation required 2.0, 1.0 and 1.2 lb/st sodium carbonate, sodium silicate and oleic acid, respectively. With a single stage of flotation, coarse bubble column flotation achieved a 90.9% $CaF_2$ concentrate with an 86.8% recovery while fine bubble column flotation yielded a 79.5% $CaF_2$ concentrate with an 89.7% recovery. It appears that higher grades were achieved with coarse bubbles rather than with fine bubbles since the frother addition needed to stabilize the fine bubbles also promoted flotation of some of the gangue constituents, particularly calcite, of which there was about 5% in the feed material.

A comparative conventional flotation was then performed using a conventional sparger for providing air bubbles. 4.0, 2.0 and 1.0 lb/st sodium carbonate, sodium silicate and oleic acid, respectively were used. A single stage of flotation produced a 67.4% $CaF_2$ concentrate with a 90.4% recovery. Thus, the flotation processes using the bubble generator of the present invention provided improved $CaF_2$ concentrates as compared with the flotation process using a conventional sparger. The bubble size optimization provided by the bubble generator of the invention was not possible using the conventional sparger.

EXAMPLE 3

Continuous pilot plant coarse bubble column flotation of the Fish Creek fluorite ore as disclosed in Example 2 was performed using the bubble generator of the present invention. The flotation apparatus including the bubble generator of the invention provided a first cleaner concentrate of 96.5% $CaF_2$ with a 94% recovery.

Similar ore treatments are also successful using the bubble generator of the invention in the treatment of chromite, fluorite, silica, mica, beryl, manganese oxide ores, ocean crust material, coal, copper sulfides, molybdenite, seigenite, gold ores, pyrite, silver ore, bulk sulfides, platinum-palladium ores, copper oxide and galena.

EXAMPLE 4

This example demonstrates the use of the bubble generator apparatus of the invention as compared with conventional apparatus in the flotation of a chromite ore obtained from the Benbow deposit in the Stillwater complex of Montana. The flotation was performed using (a) column flotation supplied with fine bubbles (0.5 mm) produced by a single bubble generator of the invention, (b) column flotation using coarse bubbles (greater than 3 mm) supplied by two conventional in-column spargers, one located at the base of the column and one located at the mid-point of the column, and (c) a conventional flotation cell apparatus including an internal impeller. The same flotation process was used in each system and included the use of a cocoamine acetate as a collector. The pH of the flotation system was adjusted to 2.0 by the addition of sulfuric acid. Both deslimed ore and slime containing ore were tested in each of the three flotation systems. The collector dosage was 1.0 lb/st for the deslimed ore and 2.0 lb/st for the slime containing ore. The results of the flotation processes are set forth below.

| Apparatus | Deslimed Ore | | Slime-Containing Ore | |
|---|---|---|---|---|
| | % $Cr_2O_3$ concentrate | % $Cr_2O_3$ recovery | % $Cr_2O_3$ concentrate | % $Cr_2O_3$ recovery |
| Invention - fine bubbles column flotation | 44.7 | 87 | 41.5 | 95 |
| Conventional sparger - coarse bubbles - column flotation | 43.8 | 85 | 41.5 | 95 |
| Conventional impeller - coarse bubbles - conventional flotation cell | 43.5 | 77 | 35.6 | 87 |

The fine bubble column flotation using bubbles supplied by the bubble generator according to the present invention produced a higher grade and recovery from the deslimed ore as compared with the other systems. Both column flotation systems provided improved grade and recovery from the slime-containing ore as compared with the conventional flotation.

EXAMPLE 5

Figure 3:
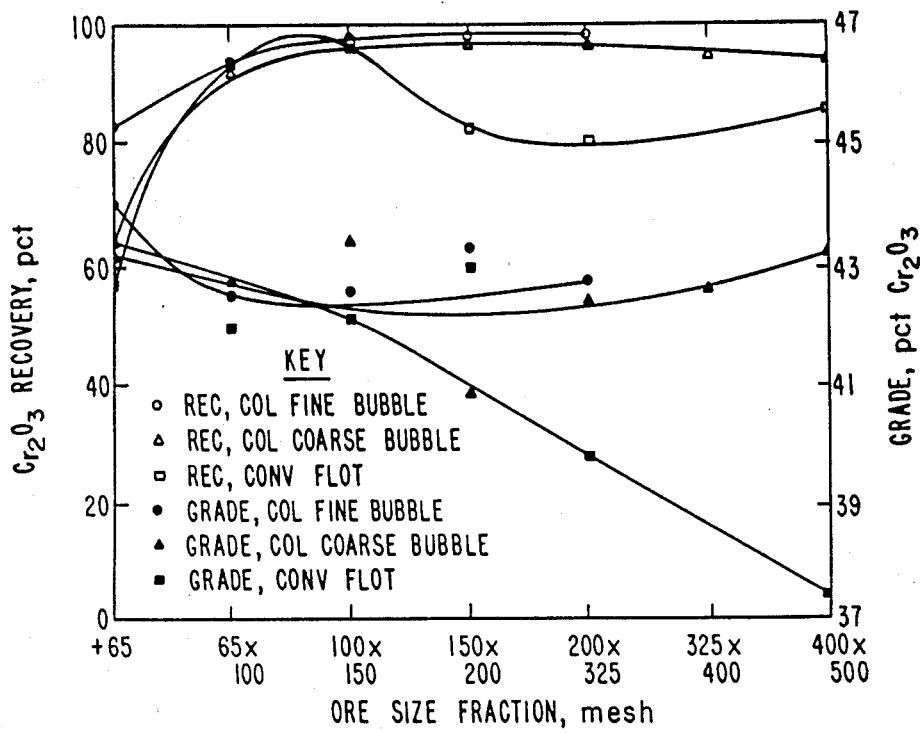
FIG. 3 discloses ore recovery and grade results from froth flotation columns using the bubble generator of the present invention and a bubble generating means.

The process of Example 4 was repeated on the systems set forth in Example 4 for various ore size fraction materials. Dowfroth 400 (supplied by Dow Chemical Company) was used as the frother and surface tension reductant for bubble generation in concentrations of 4 ppm for coarse bubble column flotation and 7 ppm for fine bubble column flotation. The grade and recovery results of the flotation processes are set forth in FIG. 3. It may be observed from FIG. 3 that the fine bubble column flotation using the bubble generator according to the present invention consistently produced higher grades and recoveries than either the coarse bubble column flotation of the conventional flotation.

Additionally, only a single bubble generator of the invention was used to supply the flotation column while two fritted glass gas spargers—a first located at the base of the column and a second located at midcolumn—were necessary to supply the flotation column. Moreover, the fritted glass gas spargers used in the coarse bubble column test work required frequent replacement due to plugging of the pores which prevented air dispersal. No replacement of the injection tip on the bubble generator of the invention was required.

As set forth previously, the embodiments and examples set forth herein are illustrative, and it is to be understood that the invention is not limited to these specific embodiments and examples.

What is claimed is:

1. A method for generating gaseous bubbles in a liquid body, comprising:
    (a) providing an apparatus comprising means defining a bubble chamber, a pressurized gas injector inlet means connected to said chamber means, at least one liquid injector inlet means connected to said chamber means and a fine injector tip having a diameter of from about 0.02 to about 0.125 inches, outlet means connecting the chamber means to said fine injector tip and packing material means inside said chamber means for increasing the mixing of gas with liquid in said bubble chamber;
    (b) mixing a pressurized gas delivered to the bubble chamber from the pressurized gas injector inlet means with a liquid delivered to the bubble chamber from the liquid injector inlet means in the bubble chamber at a pressure greater than 60 psi to dissolve at least a portion of the gas in the liquid; and
    (c) releasing the gas-liquid mixture from the bubble chamber through the outlet means and through the fine injector tip under a high velocity and shear to produce gaseous bubbles in the liquid body.

2. A method as defined by claim 1, wherein said packing material means comprises glass beads.

3. A method as defined by claim 1, wherein said means defining a bubble chamber is provided with a generally cylindrical, vertically arranged shape and further wherein the liquid injector inlet means for delivering a liquid to the bubble chamber and the outlet means connecting said chamber to said fine injector tip are arranged at opposite ends of the cylindrical chamber.

4. A method as defined by claim 1, wherein a chemical surface tension modifier is added to the liquid in an amount of less than about 25 ppm.

5. A method as defined by claim 1, wherein the gas and liquid are delivered to the bubble chamber in a gas to liquid volumetric ratio of about 0.2:1 to about 30:1.

6. A method for the froth flotation of mineral ore material, comprising:
    (a) suspending the ore material in water in a flotation column; and
    (b) supplying water containing gaseous bubbles to the flotation column, the water containing gaseous bubbles being generated external to the flotation column by
        (i) providing an apparatus comprising means defining a bubble chamber, a pressurized gas injector inlet means connected to said chamber means, at least one liquid injector inlet means connected to said chamber means and a fine injector tip having a diameter of from about 0.02 to about 0.125 inches, outlet means connecting said chamber means to said fine injector tip, and packing material means inside said chamber means for increasing the mixing of gas with liquid in said bubble chamber;

(ii) mixing a pressurized gas delivered to the bubble chamber from the pressurized gas injector inlet means with water delivered to the bubble chamber from the liquid injector inlet means in the bubble chamber at a pressure greater than 60 psi to dissolve at least a portion of the gas in the liquid; and (iii) releasing the gas-liquid mixture from the bubble chamber through said outlet means and through the fine injector tip under a high velocity and shear into the flotation column to produce gaseous bubbles in the flotation column.

* * * * *